United States Patent
Jinkins

[11] 3,901,098
[45] Aug. 26, 1975

[54] ANGLE DRIVE UNIT
[75] Inventor: Danny R. Jinkins, Bryan, Ohio
[73] Assignee: Dotco, Inc., Hicksville, Ohio
[22] Filed: Dec. 17, 1973
[21] Appl. No.: 424,953

[52] U.S. Cl. ...................... 74/417; 173/163; 74/423
[51] Int. Cl. ........................... F16n 7/18; F16h 1/14
[58] Field of Search ............... 74/417, 16, 423, 412; 173/59, 163; 308/237, 209

[56] References Cited
UNITED STATES PATENTS

| | | | |
|---|---|---|---|
| 1,978,567 | 10/1934 | Crafts | 308/209 |
| 2,604,795 | 7/1952 | Ristow | 74/417 |
| 2,981,373 | 4/1961 | Ranst | 74/417 |
| 3,667,310 | 6/1972 | Hahner | 74/417 |
| 3,719,254 | 3/1973 | Snider | 173/163 |
| 3,774,466 | 11/1973 | Bhatia et al. | 74/417 |
| 3,817,115 | 6/1974 | Schnizler et al. | 74/417 |

*Primary Examiner*—Samuel Scott
*Assistant Examiner*—Allan R. Burke
*Attorney, Agent, or Firm*—Donnelly, Maky, Renner & Otto

[57] ABSTRACT

An angle drive unit for working in close quarters comprising a housing having an enlarged portion at one end for detachable connection with the housing of a high speed hand-held pneumatic drive means and having a small diameter extension of length several times its diameter terminating in an angular head portion in which a tool driving spindle in journaled by ball bearings, said spindle having a spiral or Zerol bevel gear thereon meshing with a like bevel gear on the end of a drive shaft which is journaled in the housing by a ball bearing in the enlarged portion of the housing and a drawn cup needle bearing adjacent said bevel gear, said needle bearing being pressfitted in a bore in the housing adjacent said angle head thereof. The end of the drive shaft within the enlarged portion of the housing and within the ball bearing has a drive connection with the drive shaft of said pneumatic drive means. The angle drive unit herein is further characterized in that the drive shaft has spaced apart shoulders between which said needle bearing and a spacer is disposed with the aggregate length of the spacer and needle bearing being less than the space between the shoulders whereby, when the unit is assembled, the spacer constitutes a tool for pressing the needle bearing into the housing bore in a position so that the bevel pinion on the drive shaft may be axially retracted from the spindle bore of the angle head for insertion and withdrawal of the spindle and its ball bearings. The ball bearing in the enlarged portion of the housing is arranged for adjustment to eliminate backlash in the gearing and to take the axial thrust load imposed on the drive shaft as when spiral bevel gearing is employed and the rear spindle ball bearing is arranged to take up axial play in the spindle and resist axial thrust load imposed on the tool held thereby.

4 Claims, 1 Drawing Figure

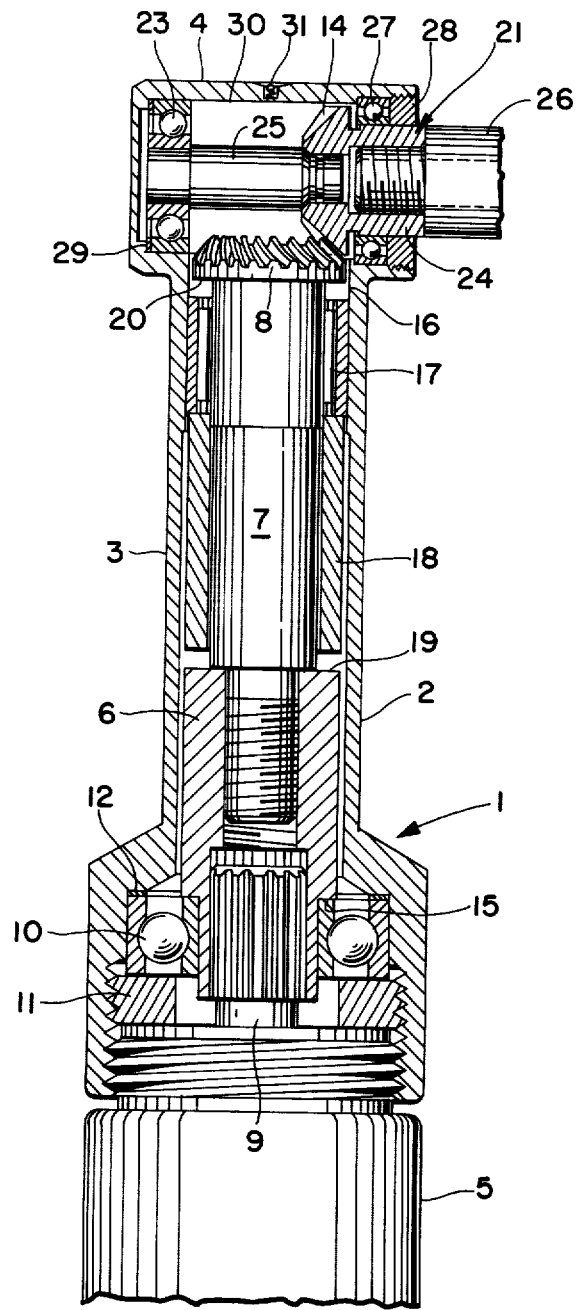

ANGLE DRIVE UNIT

BACKGROUND OF THE INVENTION

In known angle drive units as disclosed for example in Doeden U.S. Pat. No. 2,946,315 and Snider U.S. Pat. No. 3,719,254, the housing thereof is in the form of an elbow having one leg screw-connected to the housing of the air-operated motor in abutting engagement with the outer race of the front ball bearing which supports the air motor rotor in said air motor housing and within said leg is the bevel pinion which is screw-connected to the rotor shaft in abutting engagement with the inner race of said front ball bearing. The other leg of the elbow housing has the tool driving spindle journaled therein by front and rear ball bearings with a bevel gear keyed thereon and meshing with said bevel pinion.

In the use of air-operated hand tools of the character indicated it is often necessary to have the tool reach in a substantial distance in close quarters. Such known designs of angle drive heads are not adapted for miniaturization for such close quarter work because the slender elongated bevel pinion drive shaft cannot effectively resist radial load imposed by the bevel gearing. It has been proposed to neck the pinion drive shaft adjacent the pinion for use of a needle bearing but such proposals require the use of loose needles thereby making maintenance difficult and reducing speed capacity of the angle drive unit or alternatively the use of a split cage needle bearing thereby reducing load and speed capacity and in both of such arrangements it is necessary to provide an outer bearing race usually in the form of a hardened liner in the bore of the angle drive housing.

Moreover, in known angle drive units the tool drive spindle has the front and rear ball bearings engaged with shoulders on the spindle and said bearings in turn are engaged with shoulders in the angle housing whereby the housing shoulders and spindle shoulders must be located with precision otherwise the spindle may be subject to axial play together with axial movement of the spindle bevel gear. Also, in known angle drive units of the character indicated either no provision is made for axial adjustment of the drive pinion shaft whereby there will be backlash in the gear teeth unless the length of the pinion drive shaft is held to very close tolerances thus increasing cost of manufacture, or backlash must be introduced by means of a two-piece angle housing with shims at the interface of the two parts to create the proper length of housing in relation to the pinion.

SUMMARY OF THE INVENTION

In contradistinction to the foregoing the angle drive unit herein is self-contained with a housing section which is connected to the air motor housing and which contains a relatively large size ball bearing in which the drive end of the pinion drive shaft is journaled, said drive end being splined to the air motor drive shaft so that axial thrust loads on said shaft are not imposed on the rotor bearings, said housing having a small diameter extension which is of length several times the diameter thereof to render the tool operative in close quarters.

It is a principal object of this invention to provide an angle drive unit of the character indicated in which the pinion drive shaft and the tool driving spindle are each axially adjustable in the angle housing to eliminate backlash of the bevel gears and to eliminate axial play in the tool driving spindle.

It is another object of this invention to provide an elongated slender angle drive unit which is of minimum diameter equal to the diameters of the bevel gears plus the wall thickness of the housing, the elongated pinion drive shaft being composed of two parts to define a neck portion to receive a drawn cup needle bearing adjacent the drive pinion to rotatably support that end of the elongated pinion drive shaft assembly, the neck having a spacer thereon through which the drawn cup needle bearing may be pressed into the housing bore, the aggregate axial length of the spacer and needle bearing being less than the shoulder to shoulder dimension of the neck so that, upon removal of the lock ring for the ball bearing at the drive end of the pinion drive shaft, the pinion drive shaft may be retracted for insertion or withdrawal of the spindle-bearing-bevel gear assembly.

It is yet another object of this invention to provide a novel two-part spindle assembly, one part having spiral or Zerol bevel gear teeth and an integral front shaft portion to mount the tool holding chuck or the like, said front shaft portion being journaled in the front ball bearing in said housing, and the other part extending axially from the bevel gear to provide the rear shaft portion which is journaled in the rear ball bearing in said housing.

Other objects and advantages will appear from the ensuing description.

BRIEF DESCRIPTION OF THE DRAWING

The single FIGURE of the drawing is a central crossection view of the angle drive unit constituting the present invention.

DETAILED DESCRIPTION OF THE PREFERRED EMBODIMENT

The angle drive unit 1 herein comprises a housing 2 having angularly related tubular legs 3 and 4 of which the leg 3 is radially enlarged at its end for screwing onto the housing of a drive motor 5 which preferably is an air motor of the character referred to in the U.S Pat. Nos. 2,946,315 and 3,719,254.

The drive shaft of the unit 1 comprises a drive adapter 6 to which the shaft portion 7 of a spiral bevel gear 8 (or a Zerol bevel gear) is secured as by screw threads as shown, said drive adapter 6 having a splined drive connection with the motor drive shaft 9, said drive shaft 6–7 being journaled in the housing leg 3 for rotation about an axis coinciding with the axis of the motor drive shaft 9 by a relatively large size ball bearing 10 which is held in the enlarged portion of the housing leg 3 by means of the lock ring 11 which clamps the outer race of said ball bearing 10 in place, there being shims 12 to enable accurate axial adjustment to eliminate backlash in the bevel gears 8 and 14 of the angle drive unit 1, the inner race of the ball bearing 10 being a slide fit on the drive adapter and being engaged with the shoulder 15 thereof to transmit thrust load from the bevel gearing 8–14 to the ball bearing 10.

To minimize the diameter of the elongated portion of the housing leg 3, the same has a bore 16 which is just slightly larger than the diameter of the bevel gear 8 and the wall thickness of the leg 3 is of minimum thickness commensurate with strength requirements. The shaft portion 7 of the bevel gear 8 forms a neck on which the drawn cup needle bearing 17 and the spacer 18 of lightweight, low friction material are positioned prior to screwing together of the drive adapter 6 and bevel gear shaft member 7, the aggregate length of the spacer 18 and needle bearing 17 being less than the distance between the shoulders 19 and 20. In assembling the unit 1, the shaft assembly 6–7 with the spacer 18 and needle bearing 17 on the shaft portion 7 between the shoulders 19 and 20, the portion of the bore 16 adjacent the leg 4 has a press fit with the case-hardened shell of the needle bearing 17 and the rest of the bore is slightly larger to facilitate assembly, and when the leading end of the needle bearing 17 reaches the said bore portion, axial force on the drive adapter 6 will through the shoulder 19 and spacer 18 force the needle bearing 17 into said bore portion. The location can be predetermined as by gaging the distance from the end of the housing leg 3 to the end of the drive adapter 6. The ball bearing 10 is then inserted into the housing leg 3 and slip-fitted on the drive adapter 6 with the shaft assembly 6–7 pulled back to engage the shoulder 15 with the inner race of ball bearing 10 and appropriate shims 12 may be installed to precisely position the pitch cone vertex of the bevel gear 8 to coincide with the pitch cone vertex of the mating bevel gear 14 on the tool drive spindle 21. The aggregate axial length of the spacer 18 and needle bearing 17 is less than the distance between the shoulders 19 and 20 so that, when the spindle assembly 21 is installed or when it is desired to remove the same, the shaft assembly 6–7 may be pulled back with the bevel gear 8 clearing the rear bearing 23 of the spindle assembly 21.

The tool drive spindle 21 is of two-part 24 and 25 construction which herein are secured together by pressfitting but obviously said two parts 24 and 25 may be screwed, brazed, or otherwise secured together. By so forming the spindle 21 in two parts 24 and 25, tool clearance is provided at the bevel gear 14 face for cutting of spiral bevel or Zerol teeth. The bevel gear 14 has an integral shaft portion which may be internally threaded, for example, for mounting of a collet chuck body 26 or the like thereto for gripping a tool (not shown), said shaft portion being slidable in the inner race of a radial contact ball bearing 27 which is held in place by the lock ring 28. The other part 25 of the spindle 21 is pressfit into the inner race of the rear ball bearing 23 and shims 29 may be employed between the outer race of said ball bearing 23 and the bottom of the bore 30 in housing leg 4 to eliminate axial play of the spindle 21 and to provide proper meshing of the teeth of the bevel gears 8 and 14 without backlash while yet eliminating axial play of the tool driving spindle 21.

By making the drive shaft of two parts 6 and 7 replacement of either part may be effected without replacing the other part, and the materials, heat treatment etc. may be chosen to best suit the bevel gear 8 and needle bearing surface of shaft 7, while the drive adapter is selected in accordance with the splined connection with motor drive shaft 9. Similarly, the two-part 24 and 25 tool drive spindle 21 enables choice of material for the bevel gear 14 while enabling cutter clearance when forming spiral bevel or Zerol bevel gear teeth.

In summary therefore, it can be seen that the present angle drive unit 1 provides a working end which is of minimum diameter and of length several times the diameter for facilitating work in close quarters. Because of the great length of the drive shaft 6–7 in relation to its diameter, it is rotatably supported in the housing leg 3 in a relatively large ball bearing 10 around the drive adapter 6 end having a large and strong spline and by a drawn cup needle bearing 17 adjacent the bevel gear 8 end, the shaft 7 being provided with an axially movable spacer 18 thereon which is useful in pressing the drawn cup needle bearing 17 into proper position in the bore 16 of the housing leg 3 and which is of length together with the length of the needle bearing 17 such that the drive shaft 6–7 may be withdrawn so that bevel gear 8 will clear the bore 30 for insertion and removal of the spindle assembly 21 but without disturbing the preset location of the needle bearing 17. If replacement of the needle bearing 17 is ever required, the shoulder 20 on the drive shaft assembly 7–8 may be used to pull the needle bearing 17 out of the housing leg 3. For lubricating the bearings 23, 27, and 10 and bevel gears 8 and 14 the wall of the housing leg 4 may have a lubricant passage therethrough with a spring biased ball check valve 31 therein through which the lubricant may be introduced into housing leg 4.

The embodiments of the invention in which an exclusive property or privelege is claimed are defined as follows:

1. An angle drive unit comprising an elongated tubular housing of length several times its diameter and having a tubular angle head at one end of substantially the same diameter as said housing and having a radially enlarged portion at the other end adapted to be detachably secured to a power drive unit; said housing and angle head having intersecting bores of substantially the same diameter; an elongated drive shaft assembly in said housing adapted to be detachably coupled to a drive shaft of said power drive unit and having a bevel gear of substantially the same diameter as said housing bore extending into said angle head bore with its pitch cone vertex coinciding with the intersection of the axes of said bores; said assembly being journaled in said housing by a ball bearing which has its respective outer and inner races engaged with shoulders in said enlarged portion and on said assembly, and by a drawn cup needle bearing pressed in said housing bore adjacent to said bevel gear but having axial clearance therewith; said assembly having a shaft portion providing a bearing surface extending from said bevel gear through said needle bearing in direct engagement with the needles of said needle bearing; a tool driving spindle assembly journaled in said angle head by ball bearings on said spindle assembly disposed in said angle head bore in straddling relation to said bevel gear on said drive shaft assembly; said spindle assembly having a bevel gear thereon disposed between said spindle assembly ball bearings and of substantially the same diameter as said angle head bore and having the teeth thereof in mesh with the teeth of the bevel gear on said drive shaft assembly; said axial clearance between said needle bearing and the bevel gear on said drive shaft assembly being of magnitude to permit axial withdrawal of said drive shaft assembly, upon disengagement of the outer race of said housing ball bearing from said shoulder in said enlarged portion, so that the teeth of said bevel gear on said drive shaft assembly clear the angle head bore for insertion and withdrawal of said tool driving spindle assembly into and from said angle head.

2. The angle drive unit of claim 1 wherein said drive shaft assembly comprises a drive adapter secured to said shaft portion and having the shoulder which is engaged with the inner race of said housing ball bearing; said drive adapter forming with said shaft portion another shoulder disposed within said housing bore and axially spaced from said needle bearing; and a tubular spacer disposed in said housing bore and surrounding said shaft portion between said needle bearing and said another shoulder of said drive adapter; said spacer being operative through said another shoulder to press said needle bearing into said housing bore to predetermined extent during insertion of said drive shaft assembly into said housing so as to provide said clearance when the shoulder of said adapter is engaged with the inner race of said housing ball bearing and when the bevel gear on said drive shaft assembly has its pitch cone vertex coinciding with the intersection of the area of said housing and angle head bores.

3. The angle drive unit of claim 1 wherein said enlarged portion is internally threaded for engagement with said power drive unit; and wherein a lock ring screwed into said enlarged portion clamps said outer race of said housing ball bearing against the shoulder in said enlarged portion.

4. The angle drive unit of claim 2 wherein said drive adapter has a central socket of non-circular cross-section to axially slidably receive therein the drive shaft of said power drive unit when the enlarged portion of said housing is secured to said power drive unit.

* * * * *